Figure 1:
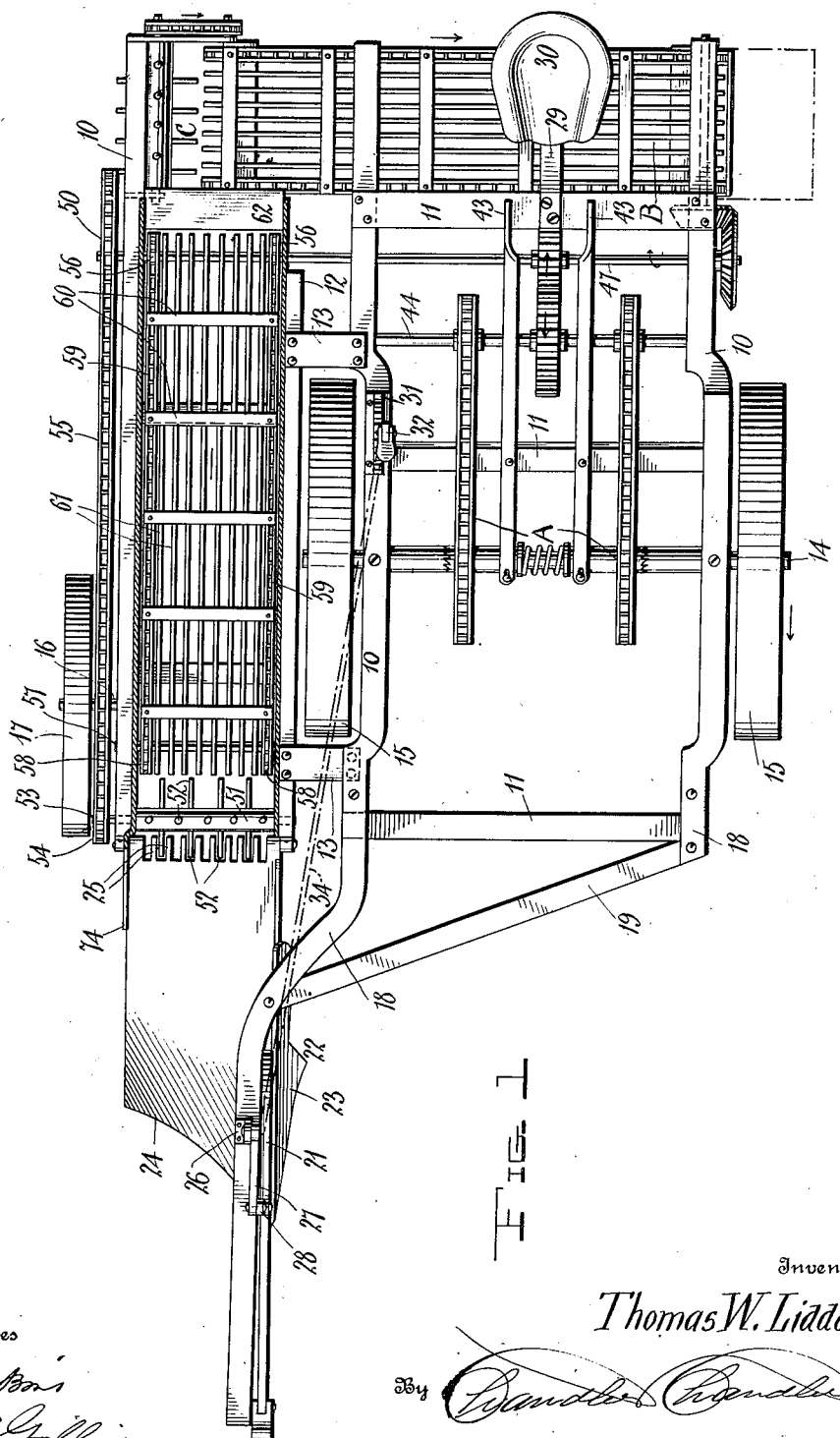

T. W. LIDDELL.
QUACK GRASS AND POTATO DIGGER.
APPLICATION FILED JULY 14, 1909.

1,000,826.

Patented Aug. 15, 1911.
3 SHEETS—SHEET 1.

Witnesses

Inventor
Thomas W. Liddell
By Chandler & Chandler
Attorneys

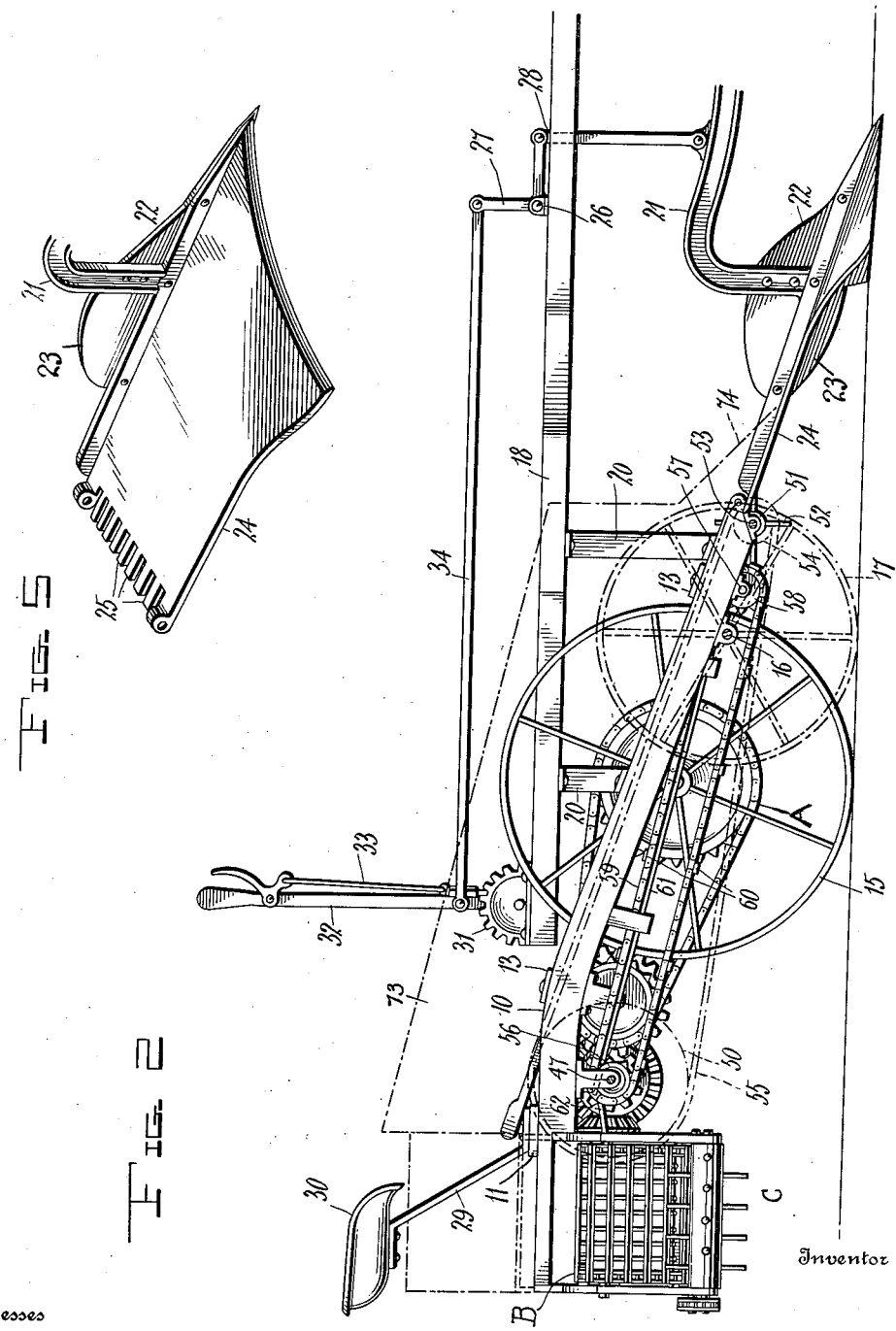

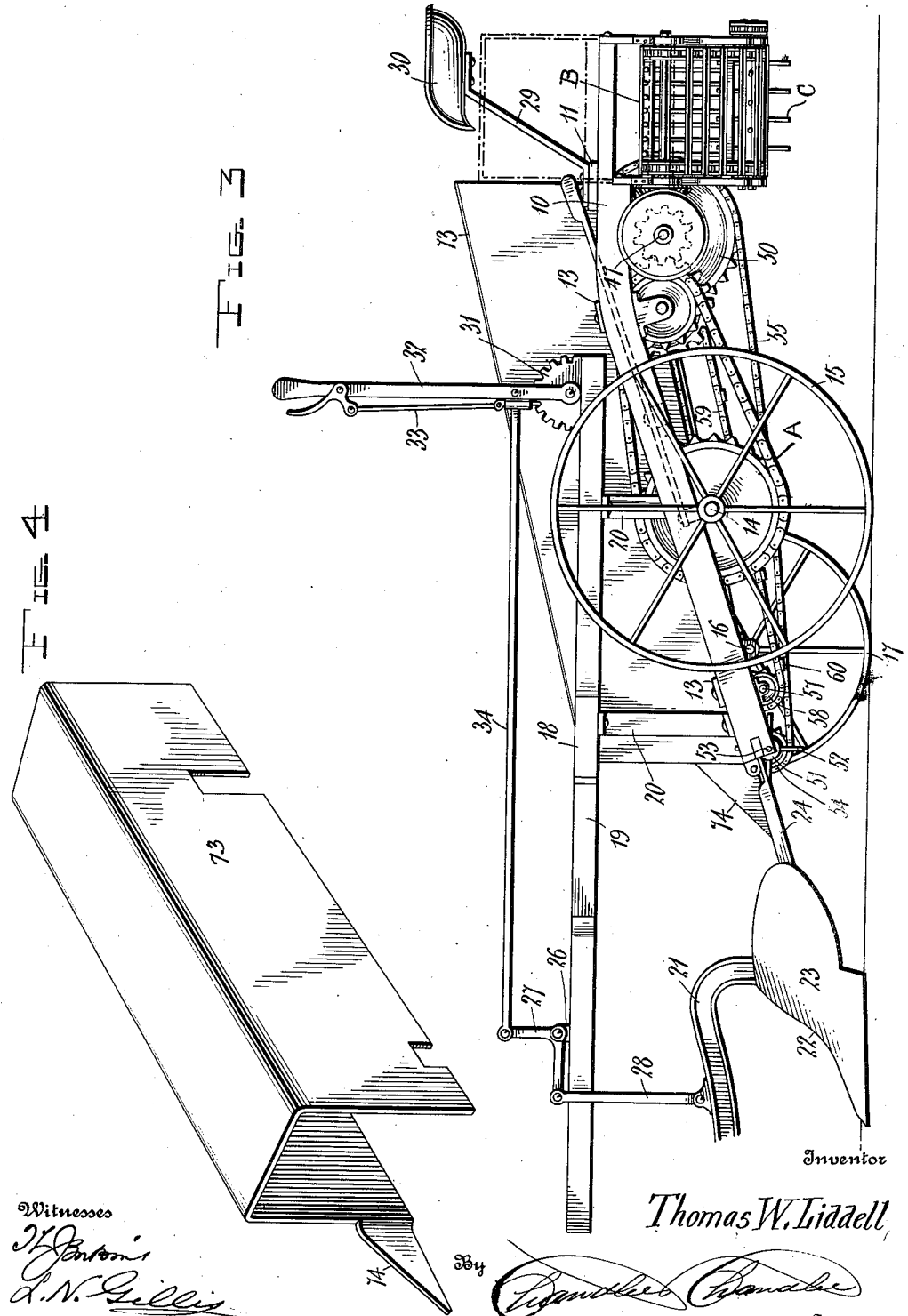

UNITED STATES PATENT OFFICE.

THOMAS W. LIDDELL, OF CADOTT, WISCONSIN.

QUACK-GRASS AND POTATO DIGGER.

1,000,826.   Specification of Letters Patent.   Patented Aug. 15, 1911.

Application filed July 14, 1909. Serial No. 507,626.

*To all whom it may concern:*

Be it known that I, THOMAS W. LIDDELL, a citizen of the United States, residing at Cadott, in the county of Chippewa, State of Wisconsin, have invented certain new and useful Improvements in Quack-Grass and Potato Diggers; and I do hereby declare the following to be a full, clear, and exact description of the invention, such as will enable others skilled in the art to which it appertains to make and use the same.

This invention relates to agricultural implements and its object is to provide an improved implement which shall be especially adapted for use as a combined quack grass and potato digger.

One object of the invention is to improve the general construction of agricultural implements of this character.

Another object of the invention is to provide an improved conveyer arrangement for implements of this character.

With the above and other objects in view the invention consists in general of a wheel supported frame having a plow of improved character on the front thereof together with certain improved arrangements of elevators.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a plan view of this invention. Fig. 2 is a side elevation thereof the view being taken from the right side. Fig. 3 is a similar side elevation from the left side. Fig. 4 is a view of the cover or housing for the elevator or conveyer. Fig. 5 is a detail view of the mold board and adjacent parts of the plow.

The main frame of this invention is made up of longitudinal bars 10 which are connected by means of suitable cross bars 11. This main frame is also provided with a longitudinal bar 12 connected to the center bar 10 by means of suitable cross bars 13. Rotatably mounted on the main frame is an axle 14 whereon are supported tractor wheels 15. One of these tractor wheels lies outside of the main frame while the other tractor wheel lies in the space between the center bar 10 and the bar 12. The main frame is also provided with a stub axle 16 whereon is mounted a ground wheel 17 and this ground wheel is so arranged that the forward end of the main frame is inclined downward as can clearly be seen from a reference to Figs. 2 and 3. Mounted on the main frame and preferably in horizontal position is an auxiliary frame comprising forwardly extending bars 18 suitably united by a cross bar 19 and these forwardly extending bars are connected to two of the bars 10 by means of struts or braces 20. Depending from the auxiliary frame is a standard 21 whereon is mounted a colter 22 provided with a left mold board 23 of ordinary construction and with a mold board 24 which consists of a broad plate having its forward edge curved and merging from a scoop shape adjacent the forward edge to a plane surface adjacent the rear end and terminating in spaced teeth 25 which are so constructed as to lie in the same horizontal plane at their points. The rear edge of the mold board 24 is pivoted to the main frame bar 12 and the outside main frame bar 10 adjacent thereto. Mounted upon the auxiliary frame bar 18 is a bracket 26 whereon is pivotally supported a bell crank lever 27 and a link 28 serves to connect one arm of this bell crank lever with the standard 21 so that as the bell crank lever is rotated the link 28 lifts the standard with the attached plow parts. Upon the rear cross bar 11 is a seat standard 29 whereon is held a driver's seat 30. Adjacent the rear end of the auxiliary frame is a quadrant 31 whereto is pivotally connected a lever 32 provided with a latch 33 adapted to engage the notches in the quadrant. A reach rod 34 is pivoted to this lever between the handle and the fulcrum thereof and the free end of this reach rod is connected to the second arm of the bell crank lever 27. By this means the operator or driver may grasp the handle of the lever 32 and raise or lower the colter 22 at his convenience and without descending from the implement. The main frame also carries a shaft 47 which is connected by suitable gearing indicated in general at A to the axle 14. On the end of this shaft 47 behind the mold board is a sprocket 50.

Mounted to the rear of the mold board 24 is a drum 51 provided with teeth 52 which are preferably arranged in four rows at right angles to each other and these teeth are further so arranged that the teeth in one row are in staggered relation to the teeth in the adjacent rows. This roller or drum 51 is further so located that the teeth thereon pass through the space between the teeth 25 on the mold board when the drum 51 is rotated. This drum has a reduced extension 53 at one end whereon is mounted a sprocket 54 connected by a chain 55 with the sprocket 50 on the shaft 47. By this means the drum 51 is caused to rotate so that the teeth 52 thereof pass upward through the spaces between the teeth 25. Furthermore, the sprocket 50 is of greater diameter than the sprocket 54 so that this drum 51 is rotated at a relatively high rate of speed. Upon the shaft 47 are also mounted spaced sprockets 56. Adjacent the drum 51 is a shaft 57 whereon are mounted spaced sprockets 58 and conveyer chains 59 extend over the sprockets 56 and 58, these conveyer chains being connected by suitable flights 60. Supported between the sprockets 58 and 56 are sifter bars 61, the bars running endwise of the conveyer and lying between the upper and lower sides thereof immediately under the flights 60. The conveyer thus formed extends longitudinally of the implement. When material, either quack grass or potatoes, is forced up the mold board 24 the rapid rotation of the drum 51 causes this material to be thrown over on to the conveyer and the flights 60 carry it along to the rear thereof. This device is also provided with a suitable transverse conveyer B to which the material passing from the rear of the first mentioned conveyer is fed by mechanism indicated in general at C.

In order to prevent the material from falling from the longitudinal conveyer the latter is provided with a housing or cover 73 having a forwardly extending guide plate 74 which runs down alongside of the mold board 24 and guides the material passing up the mold board to the conveyer.

In the operation of the device as the plow is drawn through the ground by the draft animals the material excavated passes up the mold board, is thrown by the teeth on the drum 51 on to the longitudinal conveyer, passes along that conveyer and has a considerable portion of the refuse matter sifted off therefrom through the sifter bars 61, is carried back to the conveyer running across the rear of the machine and is carried by this conveyer to a suitable receptacle, in the meanwhile losing the remainder of the dirt and other refuse.

There has thus been provided a novel and improved device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claim.

Having thus described the invention, what is claimed as new, is:—

In a device of the kind described, a main frame, wheels supporting said main frame, a conveyer frame fixed to one side of the main frame, said conveyer frame running longitudinally of the main frame and being rigidly connected thereto, a plow provided with a mold board hinged to the front of said conveyer frame, and a housing extending over the conveyer frame and having a guard portion at its forward end extending alongside of the outer edge of the mold board, whereby material passing up the mold board will be prevented from falling off said outer edge.

In testimony whereof, I affix my signature, in presence of two witnesses.

THOMAS W. LIDDELL.

Witnesses:
 VESPER MORGAN,
 LOUISE STEENBERG.